United States Patent [19]

Pitchon et al.

[11] 3,970,765

[45] July 20, 1976

[54] METHOD FOR PRODUCING SUCROSE FIXED VOLATILE FLAVORS

[75] Inventors: Esra Pitchon, Flushing; Steven Barry Chall, Monsey; Marvin Schulman, Monroe, all of N.Y.

[73] Assignee: General Foods Corporation, White Plains, N.Y.

[22] Filed: July 3, 1975

[21] Appl. No.: 593,146

[52] U.S. Cl.............................. 426/534; 426/650; 426/96; 426/103
[51] Int. Cl.²........................................ A23L 1/26
[58] Field of Search.................... 426/534, 650, 651

[56] References Cited
UNITED STATES PATENTS

| | | | |
|---|---|---|---|
| 3,767,430 | 10/1973 | Earle et al. | 426/651 |
| 3,787,592 | 1/1974 | Mitchell et al. | 426/650 |
| 3,843,822 | 10/1974 | Mitchell | 426/650 |
| 3,898,347 | 8/1975 | Mitchell | 426/534 |

*Primary Examiner*—Jeanette M. Hunter
*Attorney, Agent, or Firm*—Thaddius J. Carvis; Bruno P. Struzzi; Daniel J. Donovan

[57] ABSTRACT

An improved method for fixing volatile flavoring compounds such as acetaldehyde is disclosed. The method comprises rapidly cooling a glassy aqueous sucrose solution to cause it to solidify while maintaining it in the glassy state; charging particles of the solidified glassy sucrose solution and a volatile flavoring compound into a revolving screw fed extruder to cause intimate mixing of the charged materials and to initiate crystallization of the sucrose; expressing the resultant mixture of charged materials from the extruder; subjecting the extruded mixture to additional mixing for a period of time effective to complete crystallization, thereby forming crystalline sucrose having the volatile flavoring compound fixed within the individual sucrose crystals. Volatile flavoring compounds such as acetaldehyde can be fixed at levels of up to about 0.5%.

10 Claims, No Drawings

METHOD FOR PRODUCING SUCROSE FIXED VOLATILE FLAVORS

BACKGROUND OF THE INVENTION

This invention relates to food flavoring compositions. More particularly, it relates to an improved method for fixing volatile flavoring compounds, such as acetaldehyde in stable form.

It has been known for some time that compounds such as acetaldehyde are important flavor components of natural fruits and vegetables and serve as flavor enhancers for various flavor notes naturally present in food products of this type. Acetaldehyde in particular is important for its ability to increase the impact and apparent freshness of certain flavors. However, while the presence of acetaldehyde is a valuable enhancer in a number of food products, it has been difficult until recent years to incorporate acetaldehyde into a stable, solid flavor composition.

The art of fixing these volatile flavoring compounds has been advanced by the procedures outlined in several recent U.S. patents. U.S. Pat. No. 3,314,803, to Dame, discloses a method of fixing acetaldehyde by encapsulating it in a matrix of mannitol. This procedure produces a dry, non-hydroscopic material which retains a portion of its fixed acetaldehyde even under non-hermetic conditions. Unfortunately this procedure is very costly because of the high price of mannitol, which is usually not necessary as an ingredient in food compositions except for its use as a flavor fixative. Moreover, while an initial fixation of from about 2% to about 10% of acetaldehyde can be obtained, the initial fix will be modulated in several days and the level of acetaldehyde will equilibrate to a stable range usually between 1% to 3%. Thus, additional costs due to the loss of acetaldehyde are experienced.

In U.S. Pat. No. 3,787,592, to W. A. Mitchell, et al., there is disclosed a method for fixing volatile flavoring compounds such as acetaldehyde in crystalline materials such as sucrose and sodium chloride. By this procedure, the volatile flavoring compound is trapped within the lattice of the crystalline material at low levels. While the degree of fix is low on a weight basis, it provides economies because these crystalline materials are themselves constituents in many of the food products utilizing the flavoring compounds. Moreover, the acetaldehyde is tenaciously held.

In another recent U.S. Pat. No. 3,767,430 to E. L. Earle, et al., a further process is described for producing sucrose fixed acetaldehyde. According to this procedure, acetaldehyde is added to a supersaturated sucrose solution during crystallization to obtain a slurry wherein the acetaldehyde is fixed within the sucrose crystals. By adding a suitable quantity of crystalline sucrose with the slurry, the percentage moisture level of the slurry is reduced to levels more conducive to further handling. Here again, the level of fixation of the acetaldehyde is low but economies are achieved for the reasons mentioned with regard to the Mitchell, et al. process.

Another recently issued patent, to W. A. Mitchell, U.S. Pat. No. 3,843,822, provides yet another procedure for tenaciously fixing acetaldehyde within a sucrose matrix. According to the procedure of this patent, the acetaldehyde is provided by using paraldehyde as the source of acetaldehyde. The paraldehyde is mixed with a supersaturated sucrose solution and converted to acetaldehyde during processing.

While these recent developments provide long awaited solutions to the problem of fixing volatile flavoring compounds in solid materials, there remains a present need for enabling commercial production of these materials at even greater cost savings.

SUMMARY OF THE INVENTION

Accordingly, it is an object of the present invention to provide an improved method for fixing volatile flavoring compounds, such as acetaldehyde, into crystalline sucrose.

It is a more specific object of the present invention to enable the commercial production of dry, crystalline, fixed volatile flavoring compounds at reduced processing costs.

It is yet another object of the present invention to provide a method for producing dry, crystalline, fixed volatile flavoring materials having more uniform properties both within and between different batches of material.

These and other objects are accomplished by the present invention which provides a method for producing a solid flavoring composition containing low levels of a volatile flavoring compound comprising the steps of: providing a supersaturated, glassy, aqueous sucrose solution; rapidly cooling the aqueous sucrose solution to a temperature below about 30°F to cause it to solidify while maintaining it in the glassy state; charging the particles of the solidified aqueous sucrose solution and a volatile flavoring compound into a revolving screw fed extruder to cause intimate mixing of the charged materials and to initiate crystallization of the sucrose; expressing the resultant intimate mixture of charged materials from the extruder; subjecting the extruded mixture to additional mixing for a period of time effective to complete crystallization, thereby forming a crystalline sucrose having the volatile flavoring compound fixed within the individual sucrose crystals. According to the preferred embodiment of the invention, acetaldehyde is the volatile flavoring compound fixed within the sucrose crystals.

DETAILED DESCRIPTION OF THE INVENTION

The present invention is based upon the discovery of a new process which enables the rapid, efficient, and economical production of sucrose-fixed acetaldehyde or other volatile flavoring having a high degree of uniformity within a production run or between different production runs.

As disclosed in U.S. patent application Ser. No. 404,528 to W. A. Mitchell, filed Oct. 9, 1973, the use of a high sucrose content, supersaturated aqueous sucrose solution enables the production of sucrose fixed acetaldehyde while simplifying the recovery of dry, crystalline, sucrose fixed acetaldehyde following crystallization. It is disclosed in that application that a sucrose content of from about 88% to about 93% based upon the combined weight of sucrose and water in the sucrose solution, is necessary to attain the objectives of that invention. Similarly, these ranges can be employed according to the present invention. Lower sucrose contents (e.g. of about 83%) can, however, be employed according to this invention because a second mixing step is employed, after initial crystallization has occurred but prior to complete crystallization, which enables reduction of the moisture content of the mixture during the final stages of crystallization.

In order to provide the supersaturated, glassy, aqueous sucrose solution having the desired sucrose concentration, it is possible to heat either crystalline sucrose and water or a commercial unsaturated sucrose solution to a temperature effective to yield the proper sucrose content. Temperatures of from about 240° to about 250°F are preferred. A preferred method for preparing the sucrose solution is to charge water and crystalline sucrose in the desired proportions into an extruder having a heated barrel. The extruder will dissolve the crystalline sucrose as it heats and constantly mixes the two materials. Typical of the devices which can be employed are a Baker Perkins M-P Multipurpose Continuous Mixer and a Readco Continuous Processor. Passage of the materials through such an extruder will provide a molten, saturated sucrose solution which can then be rapidly cooled to the glassy, supersaturated state.

The molten sucrose solution is desirably extruded through a die plate having at least one orifice having a diameter of from about 1/32 inch to about ½ inch into a medium capable of rapidly cooling the sucrose material to a temperature below about 30°F. Preferably the molten sucrose is immersed in a cooling liuqid having a temperature maintained below about 0°F. Preferred cooling media would be liquid nitrogen, liquid Freon 21, liquid acetaldehyde, alcohol, and the like. The colder the fluid, the easier it is to form discrete, bead-like particles of glassy supersaturated sucrose solution. In the exemplary case where liquid nitrogen is employed as the cooling medium, discrete beads of glassy sucrose are obtained. These bead-like particles are easily handled and conveyed by continuous equipment.

While it is desirable to have the glassy sucrose material separated into discrete particles, it is not critical to employ the above procedure. Any procedure capable of producing particles of this type can be employed. For example, it is possible to simply heat an aqueous sucrose solution to the desired temperature, rapidly cool it by contact with a heat transfer surface and then break the larger mass into smaller pieces after it hardens. It is essential, however, to cool rapidly enough to obtain glassy sucrose which is substantially free of any crystalline material.

Whatever means is employed for obtaining the particles of the solidified aqueous sucrose solution, these particles are charged into a revolving screw fed extruder along with the volatile flavoring compound to cause intimate mixing of these materials and initiate crystallization of the sucrose. It is essential to the invention that mixing be intimate and that crystallization starts at the greatest number of sites so that extremely fine crystals of sucrose will be formed. It is presently believed that the large number of small particles of crystalline sucrose obtained in this manner enhances product recovery because it provides a large total surface area over which the remaining mother liquor is distributed. Because of the rapid continuous agitation provided within the extruder, uniform crystal growth is promoted. Crystallization during this stage is allowed to proceed to the fullest extent possible. If necessary because of the heat caused by the mechanical action of the extruder, the material should be cooled and maintained at a temperature of below about 70°F, and preferably below about 55°F.

The resulting intimate mixture of charged materials, now an aqueous solution of the sucrose and a volatile flavoring compound, is expressed from the extruder directly into an additional, secondary mixing device which agitates the viscous mixture for a period of time effective to complete crystallization, thereby forming a stiff crumbly mass and fixing the volatile flavoring compound within the individual crystals. Any mixing device capable of providing continuous agitation and complete mixing of the material would be suitable for the purposes of the present invention. It is noted, however, that the mixing should be vigorous enough to generate large surface areas of the mass to facilitate dehydration of the material during this processing stage. Where the sucrose content is below about 88% dehydration in this manner is essential and is facilitated by blowing low temperature, low relative humidity air into the mixer. Preferably a simple paddle mixer, for example such as a Hobart or Ross Planitary mixer is suitable; however, a Sigma mixer which operates more slowly may also be employed. The temperature for this mixing step is desirably maintained at no more than about 70°F, and preferably below about 55°F, by blowing a cool, dehumidified gas onto or through the material in the mixer. This is to prevent buildup of heat which would melt the crystals and also to dehydrate the mother liquor into a solid. In this connection, it is preferable to employ a mixer which produces a minimum amount of heat during mixing. The gas is preferably air at a temperature below 70°F and a relative humidity below 50%, more preferably at a temperature below 60°F and a relative humidity of less than 40%. This additional mixing step promotes complete crystallization and is further desirable from the standpoint that it prevents the discrete crystals from agglomerating into large, difficultly breakable masses. This not only provides improved handling properties, but makes drying more efficient. During this additional mixing, any volatile flavoring material which is released from solution with the water is desirably collected, condensed and recycled. The second mixing step will usually take from about 30 to 120 minutes for complete crystallization. Preferably, the product is dehydrated to a moisture content of less than about 4%, preferably less than about 2% during this mixing step.

The resulting mass of crystals contains no appreciable amounts of mother liquor which need to be removed before drying. If desired, this product can be dried by starting at a low temperature, typically about equal to that of the mass upon termination of crystallization, for a period before drying at elevated temperature. However, it is possible to immediately subject the crystals to slightly elevated temperatures, on the order of from about 50° to about 100°F, with only minimal loss of volatile flavoring compound due to redissolution of the crystals. The redissolution, and loss of volatile flavoring compound, can be mitigated by employing relatively high volumes of rapidly moving, low relative humidity air. In this manner, elevated temperatures can be employed without raising the temperarture of the mass due to the constant removal of heat by the vaporization of the water. The temperature is optimally, progressively increased during drying at such a rate that the remaining liquor always remains supersaturated. Those skilled in the art will be aware of the appropriate temperatures, humidities and flow rates. Obviously, the temperature differential between the crumbly mass and the drying air can be raised as the degree of moisture is reduced. The final drying temperature can be within the range of from about 20°F to about 280°F. preferably from about 140°F to about 160°F. Other suitable drying means, such as vacuum ovens and the like, can also be employed.

The improved process of the present invention can be employed to tenaciously fix volatile flavoring compounds within individual crystals of sucrose at any desired level up to a maximum of about 0.5% based on the weight of the sucrose. In the case of acetaldehyde, it is generally fixed at levels of above about 0.05%. When employed in dry beverage or dessert mixes, it is usually desirable to use crystalline sucrose prepared according to the present invention which contains the volatile flavoring compound fixed therein at the higher levels in this range. However, for other applications such as an acetaldehyde containing sugar for sprinkling on and enhancing the flavor of foodstuffs such as fruits, relatively low amounts, e.g. on the order of from about 0.001% to about 0.05%, of acetaldehyde may be desirable.

The following examples are presented for the purpose of further explaining and illustrating the present invention and are not to be taken as limiting in any sense. Unless otherwise specified, all parts and percentages are by weight.

EXAMPLE 1

This Example in accordance with the invention illustrates the production of sucrose fixed acetaldehyde. A molten sugar solution is prepared by mixing sugar and water and adding these to a kettle at 250°F to obtain a glassy solution containing 85% sucrose. The sugar glass is then formed into beads very rapidly by pouring the melted sugar into a bath of liquid nitrogen. The resulting particulates range from about ⅛ inch to ⅜ inch in diameter.

One hundred parts of the sugar glass particulates are mixed with ten parts of acetaldehyde by adding these materials to a Brabender extruder. This mixture is then rapidly and intimately mixed and crystallization of the sucrose initiated in the extruder. This step is followed by agitation of the extrudate in a Sigma blade mixer with cool dehumidified air being blown across it. The temperature for this second mixing step is kept slightly below 60°F. and is completed when the sugar dries sufficiently to become crumbly. The moisture content at this point is about 2%. The partially dry crystals are passed through a drier at 150°F. for 30 minutes to complete the drying and remove any paraldehyde odor.

EXAMPLE 2

Ten pounds of sugar are mixed with two pounds of water at ambient temperatures then heated in a steam jacketted kettle to a temperature of 244°F. The molten solution is then slowly poured into Dewar flasks containing liquid nitrogen where the solution quickly freezes into small particles of sugar glass about ½ inch in diameter. The concentration of the sugar in the glass is about 90% solids. One pound of acetaldehyde at about 30°F is then mixed with the sugar glass particles at about −30°F. The mixture is then fed into a Hobart meat grinder with a head die consisting of ¼ inch holes. The sugar glass particles are transformed almost instantly into a paste containing crystalline sugar which has the acetaldehyde fixed. Discharge temperature is about 65°F. Three pounds of this paste is placed into a 1 gallon size Sigma Blade mixer and cool, dry air at 70°F and 30% relative humidity to is blown over the material being mixed. In about 2 hours, the material is granular and relatively free flowing. This product is cured at 150°F for 30 minutes and has a fix level of 0.21%.

The above examples and explanation are for the purpose of teaching those skilled in the art how to practice the present invention. Upon reading the above disclosure, those skilled in the art will be aware of a number of modifications and variations. It is contemplated that these modifications and variations be included within the scope of the present invention which is defined by the following claims.

What is claimed:

1. A method for producing a solid flavoring composition containing low levels of volatile flavoring compound comprising the steps of:
   a. providing a supersaturated, glassy, aqueous sucrose solution;
   b. rapidly cooling the aqueous sucrose solution to a temperature below about 30°F. to cause it to solidify while maintaining it in the glassy state;
   c. charging particles of the solidified aqueous sucrose solution and a volatile flavoring compound into a revolving screw fed extruder to cause intimate mixing of the charged materials and to initiate crystallization of the sucrose;
   d. expressing the resultant intimate mixture of charged materials from the extruder; and
   e. subjecting the extruded mixture to additional mixing for a period of time effective to complete crystallization.

2. A method according to claim 1 wherein the aqueous sucrose solution is rapidly cooled by immersing it in molten condition into a liquid material maintained at a temperature of below about 0°F.

3. A method according to claim 1 wherein the volatile flavoring composition comprises acetaldehyde.

4. A method according to claim 1 wherein the mixture is dehydrated during the additional mixing step (e) by contacting the mixture with a stream of low temperature, low relative humidity gas.

5. A method according to claim 4 wherein the gas is air having a temperature of below about 70°F and a relative humidity of below about 50%.

6. A method according to claim 5 wherein the mixture is dehydrated to a moisture content of less than about 4% during the additional mixing step (e).

7. A method according to claim 6 wherein the volatile flavoring composition comprises acetaldehyde.

8. A method according to claim 6 wherein the additional mixing step (e) is carried out at a temperature of less than about 70°F.

9. A method according to claim 8 wherein the supersaturated, glassy, aqueous sucrose solution comprises from about 83% to about 93% sucrose based on the weight of the solution.

10. A method according to claim 9 wherein the aqueous sucrose solution is rapidly cooled by immersing it in molten condition into a liquid material maintained at a temperature of below about 0°F.

* * * * *

UNITED STATES PATENT AND TRADEMARK OFFICE
CERTIFICATE OF CORRECTION

PATENT NO. : 3,970,765
DATED : July 20, 1976
INVENTOR(S) : Esra Pitchon et al

It is certified that error appears in the above—identified patent and that said Letters Patent are hereby corrected as shown below:

Col. 5, line 59, "1/2" should read -- 1/4 --.

Signed and Sealed this

Third Day of May 1977

[SEAL]

Attest:

RUTH C. MASON
Attesting Officer

C. MARSHALL DANN
Commissioner of Patents and Trademarks